United States Patent [19]
Peña et al.

[11] Patent Number: 5,743,976
[45] Date of Patent: Apr. 28, 1998

[54] RADIAL TIRE FOR AIRPLANES WITH BEADS HAVING TWO BEAD RINGS

[75] Inventors: Jorge Fernando Peña, Greenville, S.C.; Robert Postic; Pierre Roux, both of Clermont-Ferrand, France

[73] Assignee: Compagnie Generale des Etablissements Michelin-Michelin & Cie, Clermont-Ferrand Cedex, France

[21] Appl. No.: 754,079

[22] Filed: Nov. 20, 1996

[30] Foreign Application Priority Data

Dec. 8, 1995 [FR] France ................ 95 15689

[51] Int. Cl.$^6$ .................. B60C 15/00; B60C 15/05; B60C 15/06
[52] U.S. Cl. ............... 152/543; 152/539; 152/541; 152/545; 152/546; 152/547; 152/552; 152/553; 152/554
[58] Field of Search ................ 152/545, 539, 152/543, 546, 547, 552, 553, 554, 541, 548, 549, 542, 560; 245/1.5

[56] References Cited

U.S. PATENT DOCUMENTS

| | | | |
|---|---|---|---|
| 2,820,500 | 1/1958 | Dickerson | 152/543 X |
| 4,356,985 | 11/1982 | Yeager et al. | |
| 5,335,707 | 8/1994 | Sano et al. | |

FOREIGN PATENT DOCUMENTS

| | | | |
|---|---|---|---|
| 1259008 | 3/1961 | France | |
| 1275616 | 10/1961 | France | 152/549 |
| 78947 | 8/1962 | France | |
| 1080886 | 4/1960 | Germany | |

OTHER PUBLICATIONS

Patent Abstract of Japanese publication No. 5229305, dated Sep. 7, 1993, Bridgestone Corp., Inventors Motohiro et al.

*Primary Examiner*—Adrienne Johnstone
*Attorney, Agent, or Firm*—Baker & Botts, L.L.P.

[57] ABSTRACT

An airplane tire with radial carcass reinforcement (3) comprising at least one ply of turned-up textile cords (3A, 3B, 3C), wound around an axially inner bead ring ($T_2$) extending axially from the inside to the outside in order to form an axially outer turn-up (30A, 30B, 30C), at least one ply (3D, 3E) of textile cords wound around an axially outer bead ring $T_1$ extending from the inside to the outside to form a turn-up (30D, 30E), characterized by the fact that the turn-up (30A) of the axially innermost ply (3A) is separated, over a certain radial portion, from the carcass ply (3D) by a profiled member (4) of rubber mix in crescent shape, the maximum thickness $e_4$ of which is at least equal to 0.5 times the total thickness t of the turn-ups (30A, 30B, 30C) of carcass plies (3A, 3B, 3C) turned-up around the axially inner bead ring $T_2$.

7 Claims, 1 Drawing Sheet

RADIAL TIRE FOR AIRPLANES WITH BEADS HAVING TWO BEAD RINGS

BACKGROUND OF THE INVENTION

The present invention relates to a tire with radial carcass reinforcement, intended to support heavy loads, to be inflated to very high pressures, and to travel at high speeds, for example, an airplane tire.

Such a tire generally comprises a carcass reinforcement formed of several plies of threads or cords of textile material forming angles which may be between 75° and 105° with the circumferential direction. Several of these plies are anchored to a bead ring in each bead, forming turn-ups after being wound around the bead ring; these plies are known as turn-up plies. A profiled member of rubber mix of high hardness generally fills the space formed between said turn-ups, the carcass plies themselves, and the bead ring. The other carcass plies have radial profiles which extend, in the region of the beads, along the axially outer face of the turn-ups of the so-called turned-up plies, terminating either at the height of the center of the bead ring or below said bead ring.

The presence of two or more bead rings in each tire bead is widely known in the field of tires with bias ply carcass plies, since the number of the plies necessarily becomes high.

French Patent 1 259 008 and its certificate of addition No. 78 947 show and describe an application of this principle to radial tires, each bead containing two bead rings and the carcass plies all being turned up around the axially inner bead ring, the turn-ups being arranged between the two bead rings and axially to the outside of the second bead ring.

Another example of the use of a bead with two bead rings is given in French Patent 1 256 432. These examples show that the carcasses can be subdivided into two groups, one being anchored to a first bead ring and the others to a second bead rings which has the enormous advantage of better distributing the tensile stresses in the carcass plies. Furthermore, and due to the fact that the surface of the bead seat has been enlarged (greater axial width), the contact pressures between the rim and the bead are distributed better and make it possible to avoid the phenomenon of rotation on the rim.

Although advantageous, the use of two or more bead rings in each bead of an airplane tire comprising a carcass reinforcement having several plies of radial cords has not proven entirely satisfactory with respect to its life under very severe conditions of travel (travel simulating travel on taxiways or tarmacs and take-offs of an airplane), more particularly at the level of the beads.

As safety demands on airplanes are becoming more and more stringent and the approval tests are becoming harder and harder, it is necessary to improve the low-zone life of such tires.

SUMMARY OF THE INVENTION

In order to achieve this objective, the invention proposes an airplane tire having a tread, a belt reinforcement, and a radial carcass reinforcement comprising at least two turned-up plies of textile threads or cables anchored in each bead which has two bead rings, and at least one ply of textile threads or cords extending along the axially outer faces of the turn-ups of the axially outer turn-up plies, characterized by the fact that at least one turned-up ply is wound around each bead ring extending axially from the inside to the outside in order to form an axially outer turn-up, the turn-up of the ply axially furthest towards the inside and turned up around the axially inner bead ring being, over a certain radial portion, separated from the carcass ply axially furthest to the inside and turned-up around the bead ring axially to the outside, by a profiled member of rubber mix in crescent shape the radially upper end of which is located at a distance from the base of the bead of between 0.15 and 0.30 times the carcass reinforcement height H of the tire and the radially lower end contained between the two straight lines, parallel to the base of the bead and passing through the center of gravity of the axially outer bead ring and the point of said bead ring furthest from the axis of rotation respectively, the maximum thickness of said profiled member being at least equal to 0.5 times the total thickness of the turn-ups of the carcass plies turned up around the axially inner bead ring.

Preferably, the said profiled member will have a secant modulus of extensibility with 100% relative elongation equal to at most 6 MPa, and, in all cases, less than the common modulus of the bead fillers located directly above the anchoring bead rings, said modulus being measured under the same conditions. Likewise, the plies turned up around the axially inner bead ring have turn-ups the ends of which are radially staggered at heights between 0.55H and 0.35H, and the axially innermost ply having the end of its turn-up closest to the axis of rotation, while the plies turned-up around the second bead ring have turn-ups the ends of which are radially staggered at heights of between 0.35 and 0.10H, the ply axially furthest to the inside having the turn-up the end of which is furthest from the axis of rotation.

The carcass ply or plies, extending along the outer face of the turn-ups of the axially outer turn-up plies, preferably has (have) its (their) end(s) located in the toe of the bead, which is the place where the end separations are least. The same is true of the axially inner and radially lower end of the narrow reinforcement ply, which is advantageously arranged axially and radially to the outside of the assembly of carcass reinforcement plies, between said plies and, on the one hand, the wall of the bead perpendicular to the axis of rotation and, on the other hand, the bead seat, said reinforcement ply having a radially upper and axially outer end located, when the tire is on its service rim, below the rim flange and being preferably formed of cables of aromatic polyamide.

It is particularly advantageous, still for the purpose of improving the life of the beads and, more particularly, of the carcass plies and of the turn-ups facing the rim flange, to arranged axially to the outside of the complex formed by the turn-ups of the so-called turned-up plies and by the edges of the axially outermost carcass plies, and axially to the inside of the layer of rubber mix, called the chafer, intended to enter to the greater part into contact with the rim flange, a profiled member of rubber of crescent shape, the maximum thickness of which, located on the line perpendicular to the outer profile of the substantially linear bead and passing through the end of the crescent-shaped profile member, located between the turn-up of the ply axially furthest to the inside and turned up around the bead ring axially to the inside and the carcass ply furthest to the inside and turned up around the bead ring axially to the outside, is between 1 and 2.5 times the thickness of the complex defined above.

The rubber mix constituting the said profiled member advantageously has a secant modulus of extensibility measured with 100% relative elongation of between 4 MPa and 5 MPa and equivalent to the modulus, measured under the same conditions, of the mix constituting the profiled member located between the turn-ups of the plies turned up around the axially inner bead ring and the plies turned up around the axially outer bead ring.

To the outside of the bead, the so-called chafer, of substantially constant thickness with respect to the part thereof facing the rim flange will preferably be formed of two grades of rubber mix: a first grade, extending from the toe of the bead to the rounded portion of the heel and forming the bead seat intended to enter into contact with the seat of the rims is defined by a modulus of extension with 100% relative elongation at least equal to 3.5 MPa; a second grade, extending radially from the rounding of the heel up to above the radially upper end of the profiled member axially outside the axially outermost ply, is defined by a modulus of extension, measured under the same conditions as above, of between 2.5 MPa and 3.5 MPa.

DESCRIPTION OF THE DRAWING

The characteristics and advantages of the invention will be better understood from the following description, read with reference to the drawing, which illustrates an embodiment and the sole figure of which.

DESCRIPTION OF PREFERRED EMBODIMENTS

Figure 1:
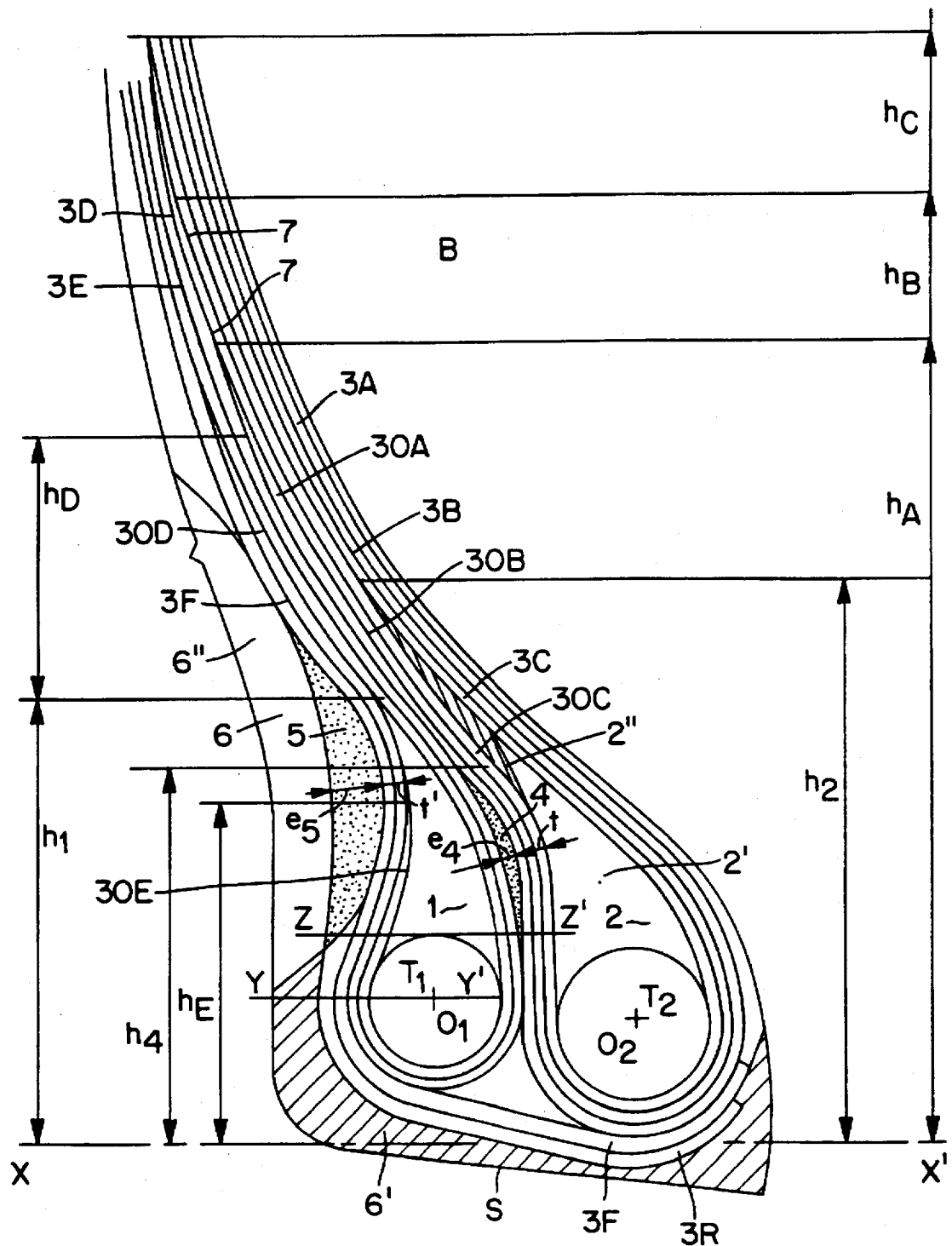
FIG. 1, shows, seen in meridian section, a tire bead in accordance with the invention.

The bead B of the tire of size 46×17.0 R 20 AIR X comprises two bead rings of "braided" type $T_1$, axially on the outside, and $T_2$, axially on the inside, both being of circular cross section and the centers of gravity $O_1$, $O_2$ of which define a straight line $O_1$, $O_2$ substantially parallel to the generatrix of the seat S of the bead B. The cross sections of the two bead rings $T_1$, $T_2$ are not equal, due to the fact that their tensile strengths, which are a function of the number and tension of the carcass reinforcement plies which are wound around them, have different values. Around the axially inner bead ring $T_2$ there are wound axially from the inside to the outside three plies 3A to 3C of the carcass reinforcement 3 in order to form, axially to the outside, the turn-ups 30A to 30C the ends of which are spaced from the base of the bead, represented by the line XX' (straight line parallel to the axis of rotation passing through the point of intersection of the generatrix of the seat of the bead with the wall of the rim flange perpendicular to said axis of rotation), of heights $h_A$, $h_B$, $h_C$, equal respectively to 0.52H, 0.45H, 0.38H, H being the height of the carcass reinforcement of the tire in question, the distance measured in the equatorial plane between the thickness center line of the carcass reinforcement and the line XX'. The heights $h_A$, $h_B$, $h_C$ are such that the height $h_C$ of the turn-up 30C of the carcass ply 3C wound around the axially inner bead ring $T_2$ axially furthest to the outside, is the largest and different from the height $h_B$ of the turn-up 30B of the carcass ply 3B wound around the bead ring $T_2$ and axially adjacent to the ply 3C by a distance $h_C-h_B$ of between 10 and 25 mm. The same is true of the distance $h_B-h_A$. The heights $h_A$, $h_B$, $h_C$ are all greater than the distance $h_2$ separating the radial upper end of the bead filler 2 surmounting the bead ring $T_2$, this distance $h_2$ being equal to 0.28H. Around the axially outer bead ring $T_1$ there are axially wound, from the inside to the outside, two other plies 3D, 3E of textile cords in order to form, axially to the outside, turn-ups 30D, 30E, the end of the turn-up 30D of the ply 3D axially furthest to the inside being located at a distance $h_D$ from the straight line XX', on the one hand greater than the distance $h_E$ between the end of the turn-up 30E of the ply 3E from the straight line XX', and on the other hand greater than the distance $h_1$ separating the radially upper end of the bead filler 1 surmounting the bead ring $T_1$ on said straight line XX', $h_E$ being less than $h_1$.

Between the turn-up 30A of the ply 3A axially furthest to the inside which is wound around the axially inner bead ring $T_2$ and the carcass ply 3D wound around the axially outer bead $T_1$ there is arranged a profiled member 4 of crescent shape, the radially upper end of which is located at a distance $h_4$ from the straight line XX', equal to 0.18H in the case described, the radially lower end of which is located radially between the straight line YY' parallel to the axis of rotation and passing through the center of gravity $O_1$ of the cross section of the bead ring $T_1$ and the straight line ZZ' parallel to the axis of rotation passing through the point of the bead ring $T_1$ furthest from said axis. The maximum thickness $e_4$ of this profiled member 4 is equal to 0.6 times the total thickness t of the three turn-ups 30A to 30C of the plies 3A to 3C, both thicknesses measured on the same line perpendicular to the turn-ups 30A to 30C.

This profiled member 4 is formed of a vulcanized rubber mix having a secant modulus of extensibility with 100% relative elongation in the order of 5 MPa, which is, compared with the common modulus of bead fillers 1 and 2 radially surmounting the bead rings $T_1$ and $T_2$, much less, the latter being in the order of 10 MPa.

In addition to the five plies 3A to 3E, an axially outermost ply 3F completes the carcass reinforcement 3. The ply 3F axially covers the plies 3D and 3E on the outside as well as their turn-ups 30D and 30E, passing below the bead rings $T_1$ and $T_2$ extending alongside the carcass ply portions radially below the bead rings and having one end located axially to the inside of the straight line perpendicular to the axis of rotation and passing through the center $O_2$ of the bead ring $T_2$ and radially to the inside of the straight line parallel to the axis of rotation and passing said point $0_2$. The ply 3F is reinforced, in its lower part, by an additional reinforcement ply 3R of cords of aromatic polyamide, oriented 85° with respect to the circumferential direction of the tire, the radially upper end of said ply being such that it is located, when the tire is mounted on its service rim, above the rim flange, the radially lower end being close to but slightly staggered from the end of the ply 3F of the reinforcement 3.

The assembly formed by the turn-ups 30D, 30E, the ply 3F, and the reinforcement 3R are, at the level of the height of the top of the rim flange greatly concave due to the presence of a rubber chafer 6 and a profiled member 5 between said chafer 6 and the assembly defined above, the profiled member 5 having the shape substantially of an isosceles triangle the radially lower end of which is located substantially on the line ZZ' parallel to the axis of rotation and tangent to the bead ring $T_1$ axially to the outside at its point furthest from the axis of rotation, and the maximum thickness $e_5$ of which is substantially on the same line parallel to the axis of rotation as the end of the turn-up 30E of the ply 3E. This thickness $e_5$ is equal to 2.1 times the thickness t' of the assembly 30D, 3F, both thicknesses measured of the same line perpendicular to the assembly 30D, 3F and, in the case described, equal to 9 mm, that is to say far greater than the thickness $e_4$ of the profiled member 4. Said profiled member 5 is formed of the same rubber mix as that which forms the profiled member 4, and its modulus of extensibility with 100% relative elongation is in the order of 5 MPa.

The chafer 6, which surrounds the bead B on the outside, is formed of two portions of different grades of rubber: the first portion 6', which extends from the toe of the bead up to the radially upper end of the rounded portion of the bead heel, is composed of a rubber mix the secant modulus of extensibility of which with 100% relative elongation is at least equal to 3.5 MPa; the second portion 6", which radially prolongs the first portion and extends up to a height substantially equal to twice the height of the rim flange, is formed of a rubber mix the modulus of extensibility of which, measured under the same conditions, is in the order of 3.0 MPa, it furthermore having, as compared with the mix of the first portion, less tendency to adhere to metal, which makes it possible to avoid, on the one hand, rotation on the rim and, on the other hand, breaks of the portions of the chafer which rest firmly against the rim flanges.

The example in accordance with the invention and which has been described above concerns a bead having two bead rings, surmounted radially by bead fillers and formed of the same rubber material. Selecting two different grades of rubber mix for the bead fillers 1 and 2, respectively, is within the scope of the invention. It is even advantageous to select two grades of rubber of different properties for the same bead fillers 1 and/or 2: the bead filler 2 is, for instance, formed of a first part 2', called the principal part, which is radially lower, in the form of a triangle and directly in contact with the bead ring $T_2$, and a second part 2", called the secondary part, of crescent shape located radially above the first part. The first part 2' is formed of a known mixture of high Shore A hardness, the second part being, in its turn, formed of a mixture of lower hardness than the preceding one.

It is obvious that the edges of all the turn-ups 30A to 30E of the plies 3A to 3E of the carcass reinforcement 3 are separated from the neighboring plies of textile cords by separation layers 7, these layers making it possible to have between the cords of axially adjacent plies, which are the most sensitive to damage, a thickness of rubber mix which is greater than the thickness present between the cables of the same plies, measured, for instance, in the regions of the crown of the tire. If the distance between the cords, due to the presence alone of the calendering mixes is 0.5 mm, it becomes equal to a value of between 0.8 and 1.0 mm in the zone of the carcass turn-up ends due to the presence of the additional separation layers.

A tire in accordance with the invention has been tested on a test flywheel, as compared with a tire having two anchoring bead rings in each bead and the same number of carcass reinforcement plies, some being turned up and others being barred, but without the crescent between the two bead rings. Under conditions of travel corresponding to and simulating separations under rated load at very high velocity, travel at low speed on taxiways, and separations under very high overload, the tires in accordance with the invention easily achieved the number of cycles required by the TSO 62d approval test, while the ordinary tires with the same number of carcass plies and two bead rings in the rubber crescent were not able to pass the test.

We claim:

1. An airplane tire having a tread, a belt reinforcement, and a radial carcass reinforcement, said carcass reinforcement having at least two turned-up plies of textile threads or cords anchored in each bead, each bead having an axially inner and outer bead ring, and at least one ply of textile threads or cords extending along the axially outer faces of the turn-ups of the axially outer turn-up plies, the tire characterized by the fact that at least one turned-up ply is wound around each bead ring, extending axially from the inside to the outside to form an axially outer turn-up, the turn-up of the ply, which is axially furthest inward and is turned up around the axially inner bead ring, being, over a given radial portion, separated from the carcass ply axially furthest to the interior and turned up around the axially outer bead ring, by a first profiled member (4) of rubber mix in crescent shape, the radially upper end of which is located at a distance $h_4$ from the base XX' of the bead which is between 0.15 and 0.30 times the carcass reinforcement height H of the tire, and the radially lower end contained between the two straight lines YY' and ZZ' which are parallel to the base XX' of the bead and pass through the center of the outer bead ring and the point of said outer bead ring furthest from the axis of rotation, respectively, the maximum thickness $e_4$ of said first profiled member being at least equal to 0.5 times the total thickness t of the turn-ups of carcass plies turned up around the axially inner bead ring.

2. A tire according to claim 1, characterized by the fact that the first profiled member (4) has a secant modulus of extensibility with 100% relative elongation less than the common modulus of bead fillers (1) and (2) located directly above the anchoring axially outer and inner bead rings and at most equal to 6.0 MPa.

3. A tire according to claim 1, characterized by the fact that the plies turned up around the axially inner bead ring have turn-ups the ends of which are radially staggered at heights between 0.55H and 0.35H, and the axially innermost ply has the end of its turn up closest to the axis of rotation, while the plies turned up around the axially outer bead ring have turn-ups the ends of which are radially staggered at heights between 0.35H and 0.10H, the ply axially furthest to the inside having the end of its turn-up furthest from the axis of rotation.

4. A tire according to claim 1, characterized by the fact that the at least one carcass ply extending along the axially outer faces of turn-ups of the axially outer turn-up plies has its ends located in the toe of the bead.

5. A tire according to claim 1, characterized by the fact that each bead includes, axially and radially to the outside of the axially outermost carcass ply; an additional reinforcement ply of cables of aromatic polyamide, oriented 85° with respect to the circumferential direction of the tire, the axially outward and radially upper end of said additional reinforcement ply being such that it is located, when the tire is mounted on its service rim, below the rim flange, the radially lower and axially inner end being located in the toe of the bead.

6. A tire according to claim 1, characterized by the fact that there is arranged, axially to the outside of the region containing the turn-ups of the plies on the axially outer bead ring and the edges of the axially outermost carcass plies and axially to the inside of a chafer (6) of rubber mix intended to enter in major part into contact with the rim flange, a second profiled member (5) of rubber mix in crescent shape, the maximum thickness $e_5$ of which, located on a line perpendicular to the outer profile of the substantially linear bead and passing through the end of the first crescent-shaped profiled member (4) and located between the turn-up of the ply axially furthest to the inside and turned up around the axially inner bead ring and the carcass ply furthest to the inside and turned up around the axially outer bead ring, is between 1 and 2.5 times the thickness t' of the region defined above, and the radially lower end of which is located substantially on the line ZZ' parallel to the axis of rotation and tangent to the axially outer bead ring at its point furthest from the axis of rotation.

7. A tire according to claim 6, characterized by the fact that the chafer (6) surrounding the bead on the outside is formed of two portions of different grades of rubber: a first portion (6'), extending from the toe of the bead up to the radially upper end of the rounded portion of the bead heel, formed of a rubber mix the secant modulus of extensibility with 100% relative elongation of which is at least equal to 3.5 MPa, and a second portion (6") radially prolonging the first portion and extending up to a height substantially equal to twice the height of the rim flange when the tire is mounted on its service rim, formed of a rubber mix the modulus of extensibility of which measured under the same conditions is between 2.5 MPa and 3.5 MPa.

* * * * *